United States Patent [19]

November

[11] 3,992,939
[45] Nov. 23, 1976

[54] APPARATUS FOR PRODUCING A MASS FLOW RATE SIGNAL WITH OR WITHOUT A DENSITY SIGNAL

[75] Inventor: Milton H. November, Hacienda Heights, Calif.

[73] Assignee: International Telephone and Telegraph Corporation, New York, N.Y.

[22] Filed: Feb. 11, 1976

[21] Appl. No.: 657,092

[52] U.S. Cl. .......................... 73/194 M; 73/194 VS
[51] Int. Cl.² ....................... G01F 1/32; G01F 1/86
[58] Field of Search .......... 73/194 M, 194 VS, 32 A

[56] References Cited
UNITED STATES PATENTS 3,719,073  3/1973  Mahon ............................ 73/194 VS
3,937,195  2/1976  Woods ......................... 73/194 M X Primary Examiner—James J. Gill
Attorney, Agent, or Firm—A. Donald Stolzy

[57] ABSTRACT

A vibration densitometer probe is employed with a shield that produces vortex shedding. The probe has a vane that is vibrated at an amplitude modulated acoustic frequency. The envelope may be employed to compute mass flow rate. The said acoustic frequency may be employed to compute density and/or mass flow rate.

13 Claims, 10 Drawing Figures

APPARATUS FOR PRODUCING A MASS FLOW RATE SIGNAL WITH OR WITHOUT A DENSITY SIGNAL

BACKGROUND OF THE INVENTION

This invention relates to vibration densitometers, and more particularly to a shield in which a densitometer probe can be contained so as to create vortex shedding, and means to produce an output directly proportional to mass flow rate with or without an output directly proportional to density or specific gravity. Shields have been used in the prior art, but not of the desirable construction for vortex shedding. However, see, for example, copending application Ser. No. 634,047 Nov. 21, 1975, by Joseph J. Ponzi for VIBRATION DENSITOMETER WITH PROBE ASSEMBLY HAVING DOUBLE CALIBRATION SHIFT SUPPRESSION assigned to the assignee of the present invention.

SUMMARY OF THE INVENTION

In accordance with the apparatus of the present invention, the abovedescribed and other disadvantages of the prior art are overcome by mounting a shield to produce vortex shedding on a probe driver assembly employed to vibrate a probe structure and computing mass flow rate by the equation $$\dot{m} \; Cf_v(AT^2 - B)$$

where
$\dot{m}$ is the mass flow rate,
$T$ is the probe period,
$f_v$ is the frequency of the amplitude modulation of the probe carrier frequency $f$,
$f = 1/T$, and
$A, B$ and $C$ are constants.

The above-described and other advantages of the present invention will be better understood from the following detailed description when considered in connection with the accompanying drawings.

BRIEF DESCRIPTION OF THE DRAWINGS

In the drawings, which are to be regarded as merely illustrative.

DESCRIPTION OF THE PREFERRED EMBODIMENT

Portions or all of structures disclosed in U.S. Pats. Nos. 3,677,067; 3,741,000; and 3,883,811 may be employed in the present invention. The same is true of other conventional vibration densitometers.

Figure 1:
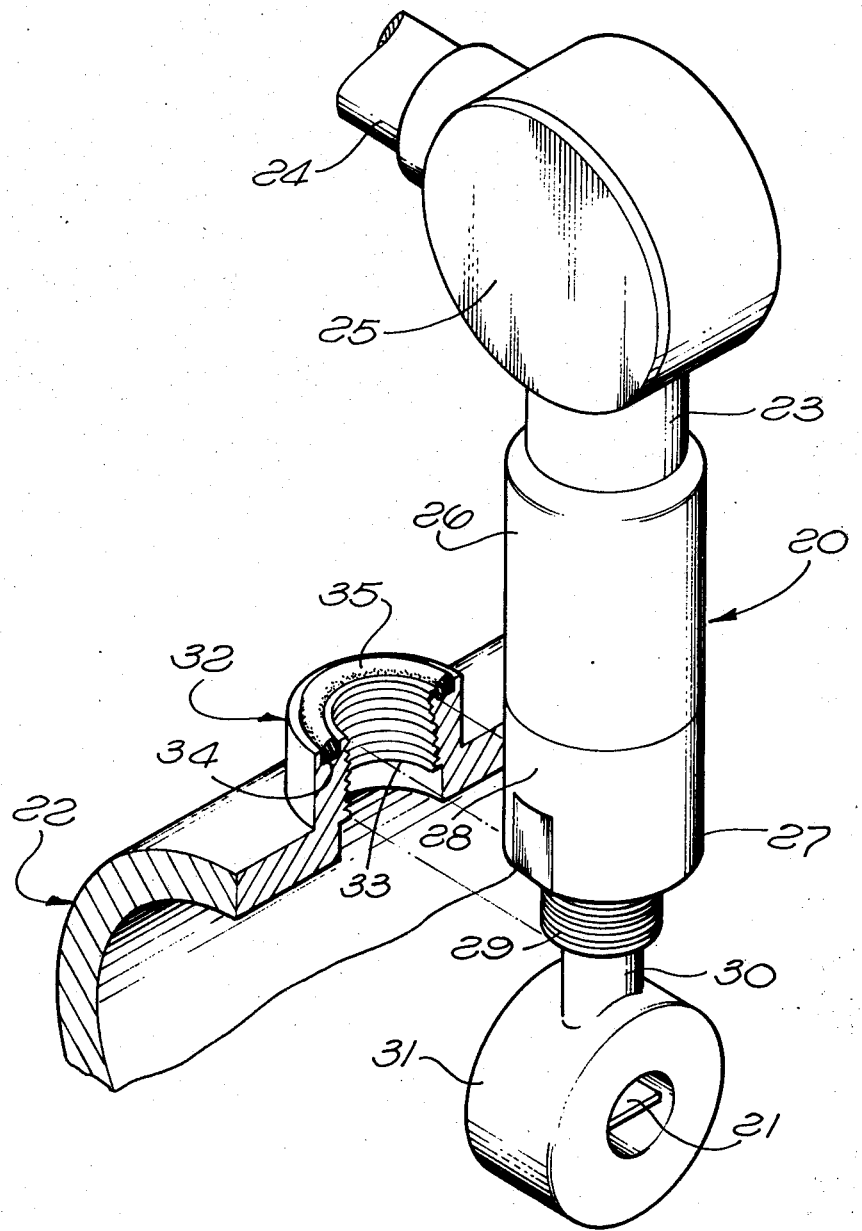
FIG. 1 is an exploded perspective view of a conventional vibration densitometer probe, a portion of its mount and a portion of a pipeline.
Figure 3:
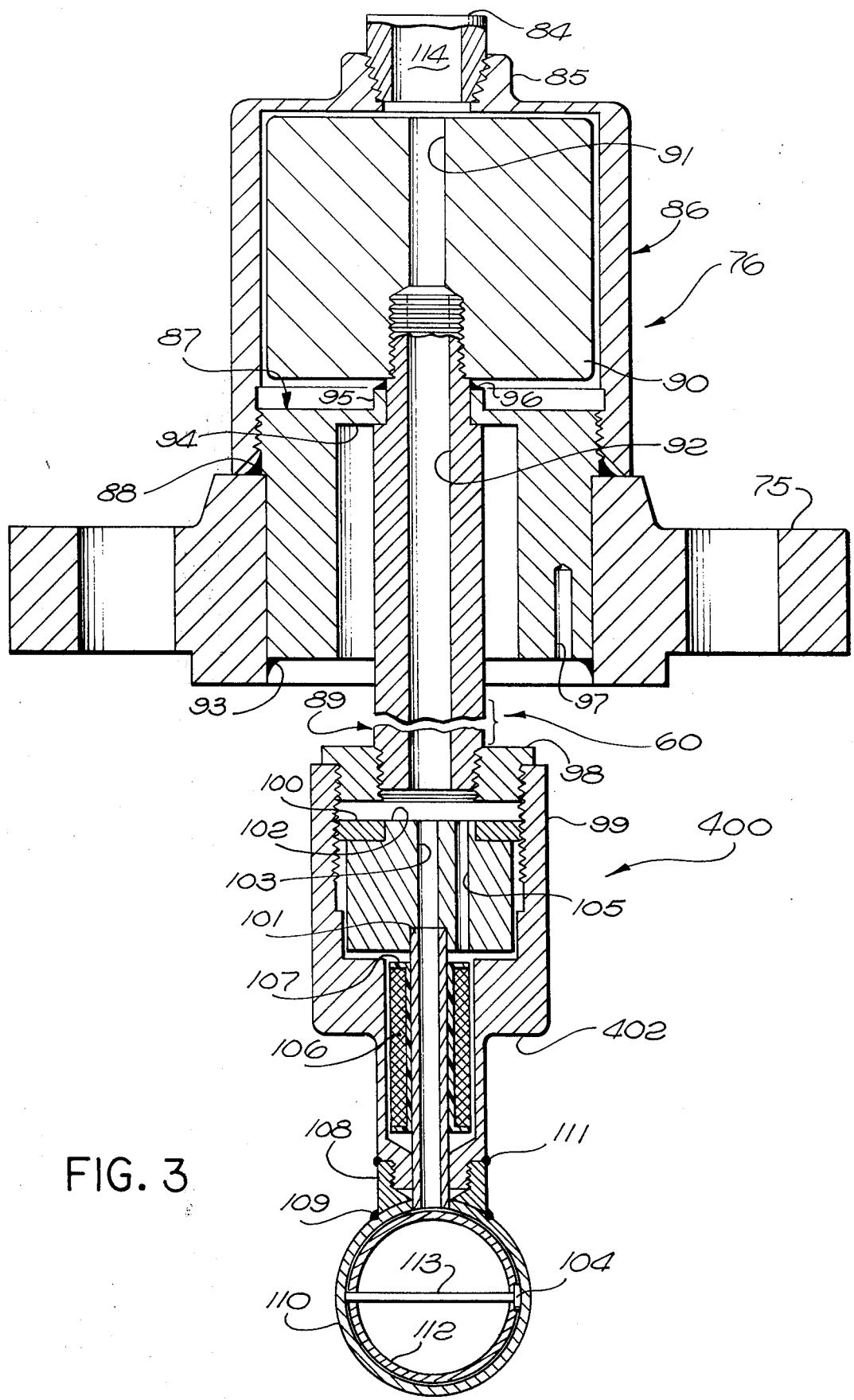
FIG. 3 is a vertical sectional view of the densitometer probe illustrated in FIG. 2.

A vibration densitometer probe is shown at 20 in FIG. 1 having a vane 21 which is vibrated. Vane 21 is vibrated because the probe has a piezoelectric crystal pick-up, not shown in FIG. 1, the output of which is amplified and the vane 21 vibrated by a magnetostrictive driver assembly 400 such as is shown in FIG. 3. The resonant vibrational frequency of vane 21 is a known function of the density of the liquid in which the vane 21 is immersed.

Figure 2:
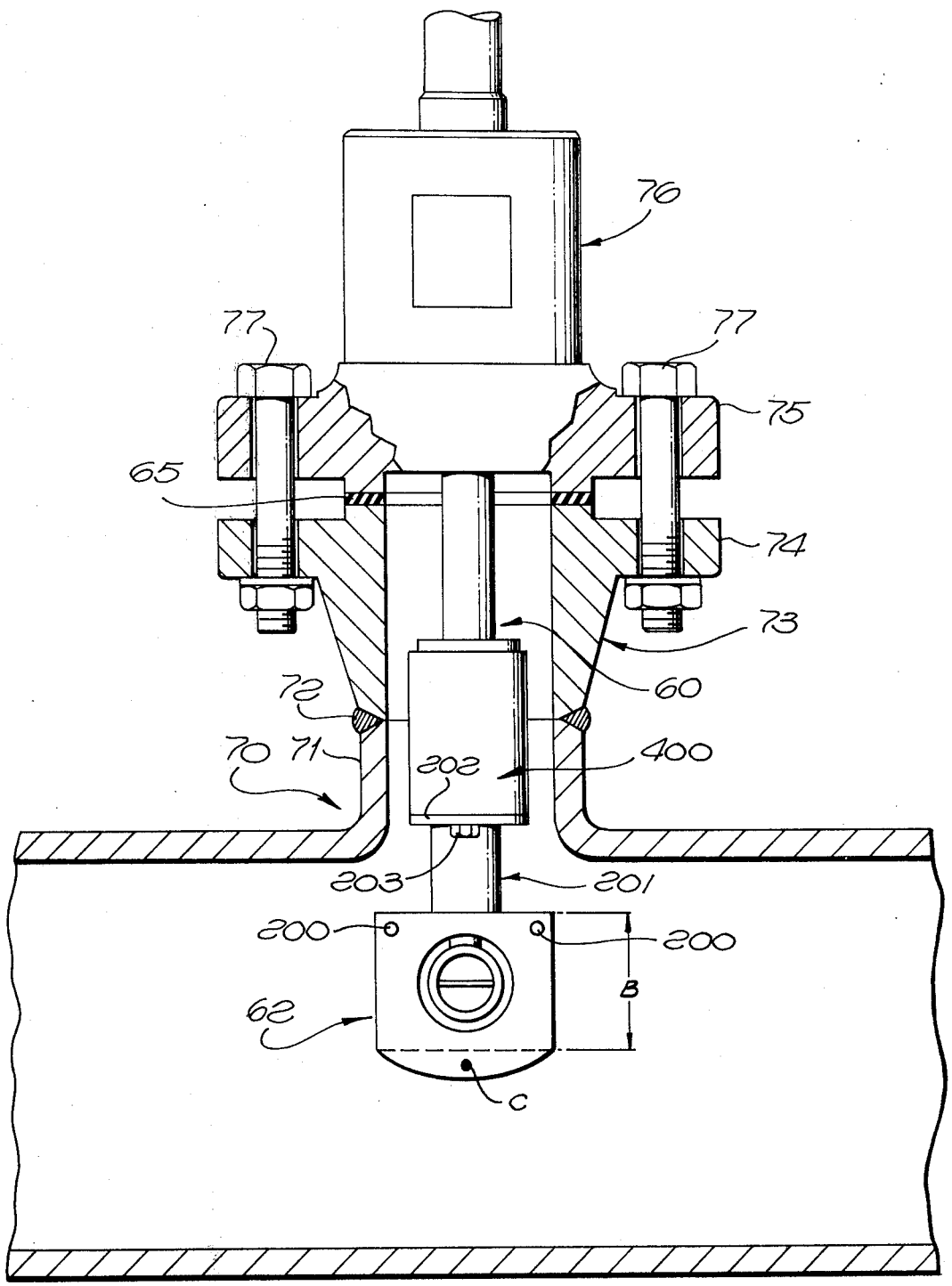
FIG. 2 is a vertical sectional view, partly in elevation, through a pipeline having an alternative conventional densitometer probe mounted therein with a shield thereon constructed in accordance with the present invention.

Probe 20 is shown in FIG. 2 for mounting in a pipeline 22.

The probe 20 may be identical to the probe shown in the said U.S. Pat. No. 3,741,000 with certain exceptions. All these exceptions are noted hereinafter.

The said U.S. Pat. No. 3,741,000 is referred to hereinafter as the "later" patent.

The probe 20 is identical to the probe of the said later patent except for the addition of conduits 23 and 24, and a pull box 25, all shown in FIG. 1. Conduits 23 and 24 and pull box 25 simply serve as enclosures for the output leads from probe 20.

conduit 24 may be threaded to pull box 25 in any conventional manner. Conduit 23 is threaded to pull box 25 and to a body 26 of probe 20. Conduits 23 and 24, pull box 25 and body 26 are, thus, all fixed together. A body 27 is fixed to body 26. Body 27 has an upper portion 28 of a larger diameter and a lower portion 29 of a smaller diameter that is externally threaded. A shank 30 is fixed to threaded portion 29 and to a cylinder 31. Vane 21 is mounted in a fixed position along its opposite edges to cylinder 31, as shown in FIG. 1.

Pipeline 22 in FIG. 1 has a hollow cylindrical projection 32 permitting probe 20 to be lowered thereinto, projection 32 having an axis perpendicular to the axis of pipeline 22. Projection 32 is internally threaded at 33. Probe portion 29 is threaded into projection 31 at the thread 33. Projection 31 has an O-ring groove 34, and an O-ring 35 therein that seals with a shoulder, not visible in FIG. 1, at the bottom of probe portion 28 where the diameter of the probe is reduced to the diameter of the threaded portion 29 thereof. The The bottom surface of the probe portion 28 may be flat and in a plane perpendicular to the vertical axis of the probe 20 so as to rest on O-ring 35, O-ring 35 thereby sealing probe 20 inside pipeline 22. At least that portion of probe 20 below the thread 29, thus, protrudes downwardly inside pipeline 22 below the upper surface of projection 32.

All the structures shown in FIG. 1 may be entirely conventional, if desired.

The structures of FIG. 1 may be modified by mounting a shield on a driver assembly in a position such that the shield does not touch shank 30 or any structure of probe 20 at a location therebelow. Both halves of the shield are substantially identical. One-half of the shield is indicated at 204 in FIG. 4.

The probe shield and a probe constructed in accordance with the present invention is illustrated in FIG. 2.

This arrangement includes a conventional densitometer probe 60 having a vane 113 (FIG. 3) and a shield 62. A flange 75 is sealed to a flange 74 by a gasket 65.

A pipeline is illustrated at 70 in FIG. 2 having a hollow cylindrical projection 71 which is welded at 72 to a fitting 73 that has the flange 74, flange 74 being bolted to flange 75 of an assembly 76 at preferably three or more or, for example, eight places 77.

A vertical sectional view of probe 60 is shown in FIG. 3 where assembly 76 includes a nipple 84 threaded into a hollow cylindrical projection 85 of an end cap 86. End cap 86 is threaded to a body 87. Flange 75, end cap 86 and body 87 are welded or soldered together at 88. A hollow shaft 89 is externally threaded into a cylinder 90 that is solid except for a hole 91 which extends completely therethrough and is in communication with the hollow interior 92 of shaft 89. Body 87 is welded at 93 to flange 75, and is provided with a thin web 94 which has an upwardly extending cylindrical projection 95 that is welded at 96 to shaft 89 and to cylinder 90. Body 87 may be provided with a pin hole 97, if desired, so that it may be held while end cap 86 is turned or threaded thereto.

Shaft 89 is, in turn, fixed to a ferrule 98 by being threaded thereinto. Ferrule 98, in turn, is fixed to a body 99 by being threaded thereinto.

A ring 100 is threaded into body 99. A magnetostrictive tube 101 which is hollow and open at both ends is press fit into a body 102. Body 102 is similar to a body disclosed in the said U.S. Pat. No. 3,741,000, and may be identical thereto, if desired. Alternatively, body 102 may have one hole 103 to receive lead wires from a piezoelectric cyrstal 104, and a hole 105 to receive lead wires from a drive coil 106, the latter being wound on a dielectric spool 107 press fit onto tube 101. A ferrule 108 is welded at 109 to a cylinder 110. Body 99 is threaded into ferrule 108 and welded thereto at 111. Tube 101 extends, at the bottom thereof, through a circular hole in cylinder 110 and bears against the external cylindrical surface of a cylinder 112. Vane 113 is fixed inside cylinder 110 in a manner identical to that illustrated in the said U.S. Pat. No. 3,677,067. The same is true of crystal 104.

The utility of a vibration densitometer employing the structure disclosed herein is described in detail in the last mentioned patent.

Cylinders 110 and 112, vane 113, and crystal 104 may be identical to those disclosed in the last mentioned patent, if desired. Tube 101 is slidable through the lower end of body 99 and is slidable through the said circular hole through cylinder 110, as is known from the said last mentioned patent.

A more detailed explanation of the operation of a vibration densitometer employing the structure disclosed herein is set forth in the said last mentioned patent.

It is common to use a preamplifier in the probe. Such a preamplifier may be employed at 114 in FIG. 3, or at any other convenient location, as desired. The word "fluid" is hereby defined to mean liquid except that it is defined to mean one or more particular fluids should the invention be operative in one or more particular fluids.

SHIELD 62 is constructed of two halves, only one of which is shown in FIG. 2. These two halves are identical except that tapped holes extend partially through one and Allen head screws are slidable through two corresponding holes of the other. The screws thus hold the halves together around probe 60 at 200.

Shield 62 has a shank 201 that has a flange 202 fixed to assembly 400 on opposite sides thereof by cap screws 203.

Everything shown in FIG. 2 may be entirely conventional except shield 62, shields being old in the prior art, but not shield 62.

Shield 62 has a generally elliptical cross section horizontally perpendicular to the plane of the drawing in FIG. 2 and is an approximately mathematical right elliptical cylinder over length B thereof. Portion C may be an ellipse of half revolution.

Figure 4:
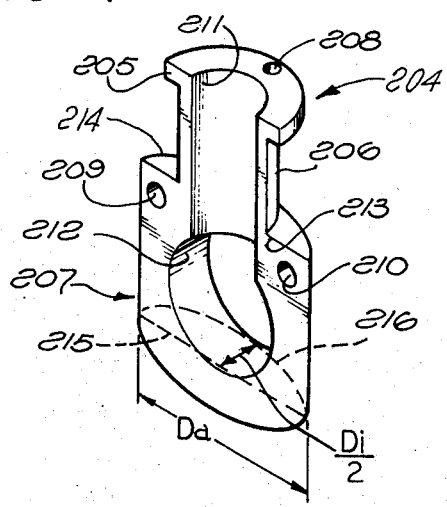
FIG. 4 is a perspective view of one-half of the probe shield shown in FIG. 2.

A half portion 204 of shield 62 is shown in FIG. 4 including a half flange 205, a half shank 206 and a half body 207. Flange 205 has a cap screw hole 208 therethrough. Body 207 has two Allen head screw holes 209 and 210 therein. Shank 206 has a half bore 211 that intersects and communicates with a full bore 212 which extends all the way through body 207. Solid edges 213 and 214 approximately form one-half of an ellipse and dotted lines 215 and 216 form an identical one-half ellipse between which body 207 is substantially a solid half, elliptical mathematical cylinder, i.e., except for bores 211 and 212, and holes 209 and 210. Below the plane of the half ellipse bounded by dotted lines 215 and 216, body 207 is a one-quarter ellipse of revolution. Each half ellipse has a major axis $D_a$ and a minor axis $D_r$. Each minor axis $D_r$ is equal to the outside diameter of shank 206.

Figure 5:
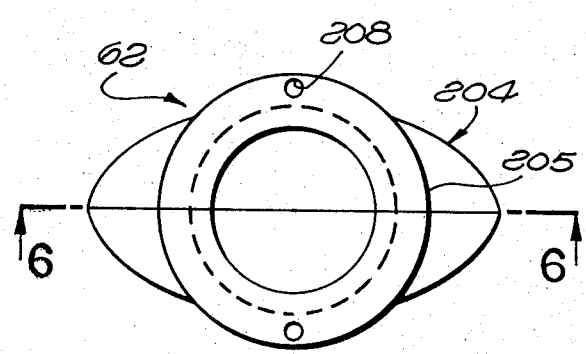
FIG. 5 is a top plan view of the probe shield constructed in accordance with the present invention.

Shield 62 is shown in FIG. 5 including half portion 204 and another half portion 217.

Figure 6:
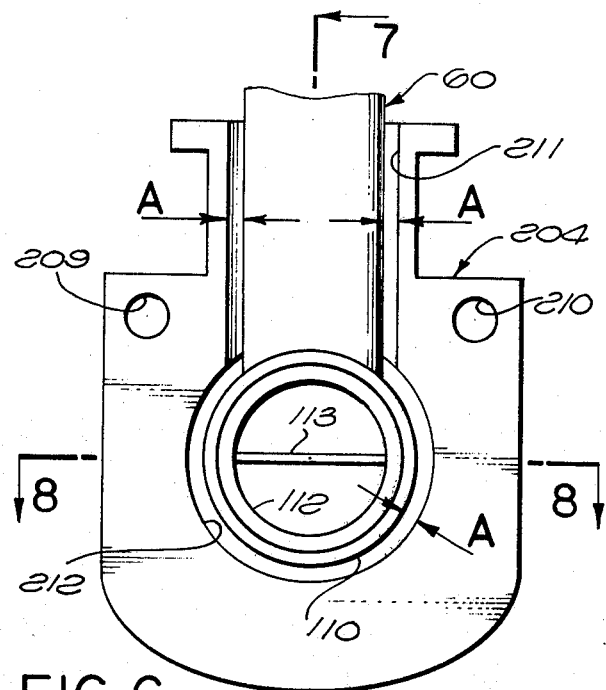
FIG. 6 is an elevation of the shield half take on the line 6—6 shown in FIG. 5 with the probe located therein.

In FIG. 6 probe 60 is shown inside bores 211 and 212 with a minimum clearance of A, A being small in comparison to all the other dimensions in FIG. 6.

Figure 7:
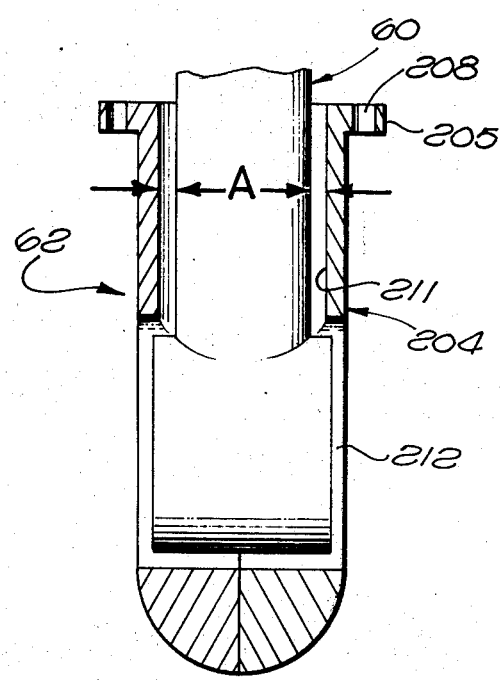
FIG. 7 is a vertical sectional view of the shield taken on the line 7—7 shown in FIG. 6.

The arrangement of probe 60 in shield 62 is shown again in FIG. 7.

Figure 8:
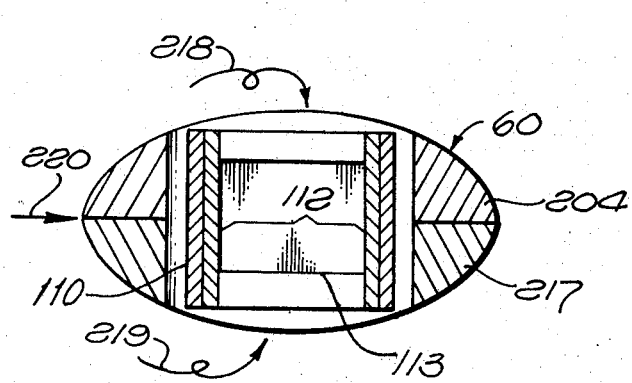
FIG. 8 is a transverse sectional view of the shield taken on the line 8—8 shown in FIG. 6.

In FIG. 8 vortex shedding is produced as indicated by arrows 218 and 219 with fluid flow in the direction of arrow 220.

Figure 9:
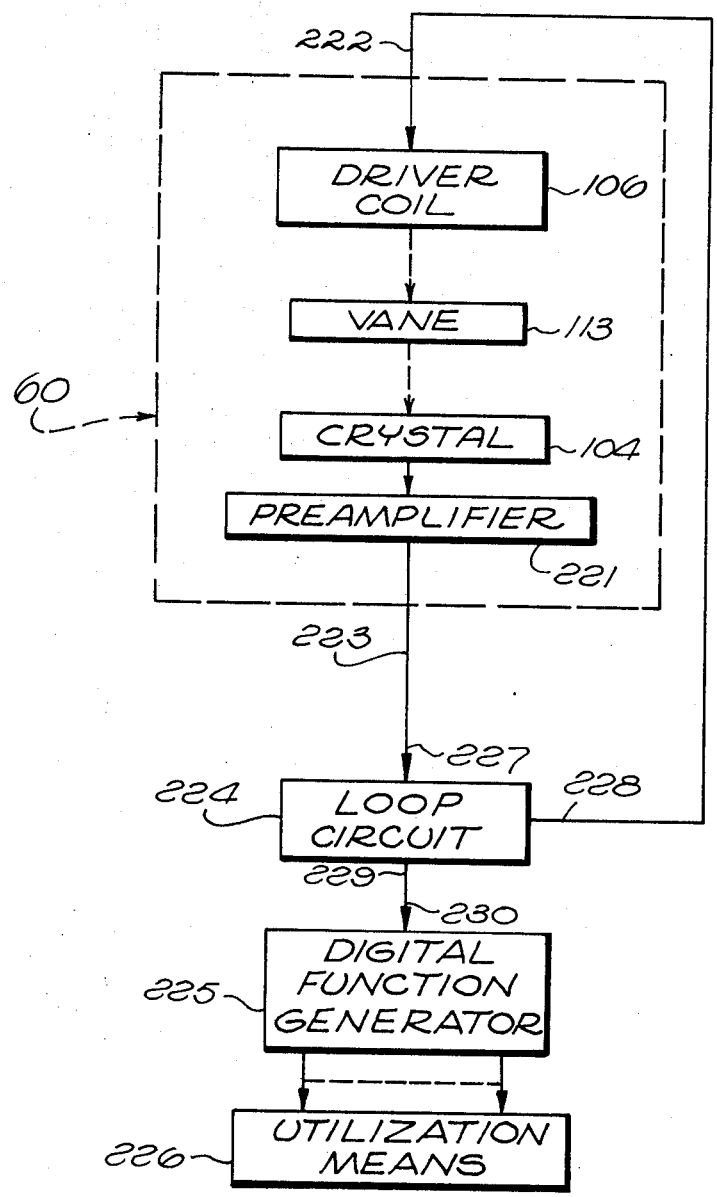
FIG. 9 is a block diagram of a prior art vibration densitometer.

Probe 60 is illustrated again in FIG. 9 having driver coil 106, vane 113, piezoelectric crystal 104 and a preamplifier 221.

Probe 60 has an input lead 222 and an output lead 223.

Other blocks shown in FIG. 9 are a loop circuit 224, a digital function generator 225 and utilization means 226. Loop circuit 224 has an input lead 227 and output leads 228 and 229. Digital function generator 225 has an input lead 230 connected from loop circuit output lead 229. The output of digital function generator 225 is connected to utilization means 226.

The output lead 223 of probe 60 is connected to the input lead 227 of loop circuit 224. The input lead 222 of probe 60 is connected from the output lead 228 of loop circuit 224. Probe 60 and loop circuit 224 form a closed loop electromechanical oscillator. Vane 113 is submerged in a fluid. The density of the fluid is a function of the frequency at which vane 113 vibrates.

Digital function generator 225 may have its input lead 230 connected from lead 228 or at other points in loop circuit 224. Loop circuit 224 impresses a square wave voltage on input lead 230 of digital function generator 225 having a mark-to-space ratio of 1:1.

Utilization means 226 shown in FIG. 9 may be an analog, a digital or a binary coded decimal process controller, a density indicator, specific gravity indicator, or otherwise.

Probe 60 shown in FIG. 9 may be entirely conventional. However, shield 62 is new and constructed in accordance with the present invention.

Preamplifier 221 shown in FIG. 9 may be entirely conventional. All the structure illustrated in FIG. 9 except shield 62 may be entirely conventional and as disclosed in U.S. Pat. No. 3,883,811.

OPERATION

In the portion of the embodiment of the invention shown in FIG. 9, probe 60 and loop circuit 224 provide an electromechanical oscillator which oscillates at a frequency dependent upon the density of the fluid in which vane 113 is immersed. The same is true of the pulse repetition frequency of the square wave voltage applied to the input lead 230 of digital function generator 225.

Digital function generator 225 may be described as a digital linearization circuit. It produces a digital output directly proportional to density from the input signal thereto impressed upon the input lead 230 thereto.

Figure 10:
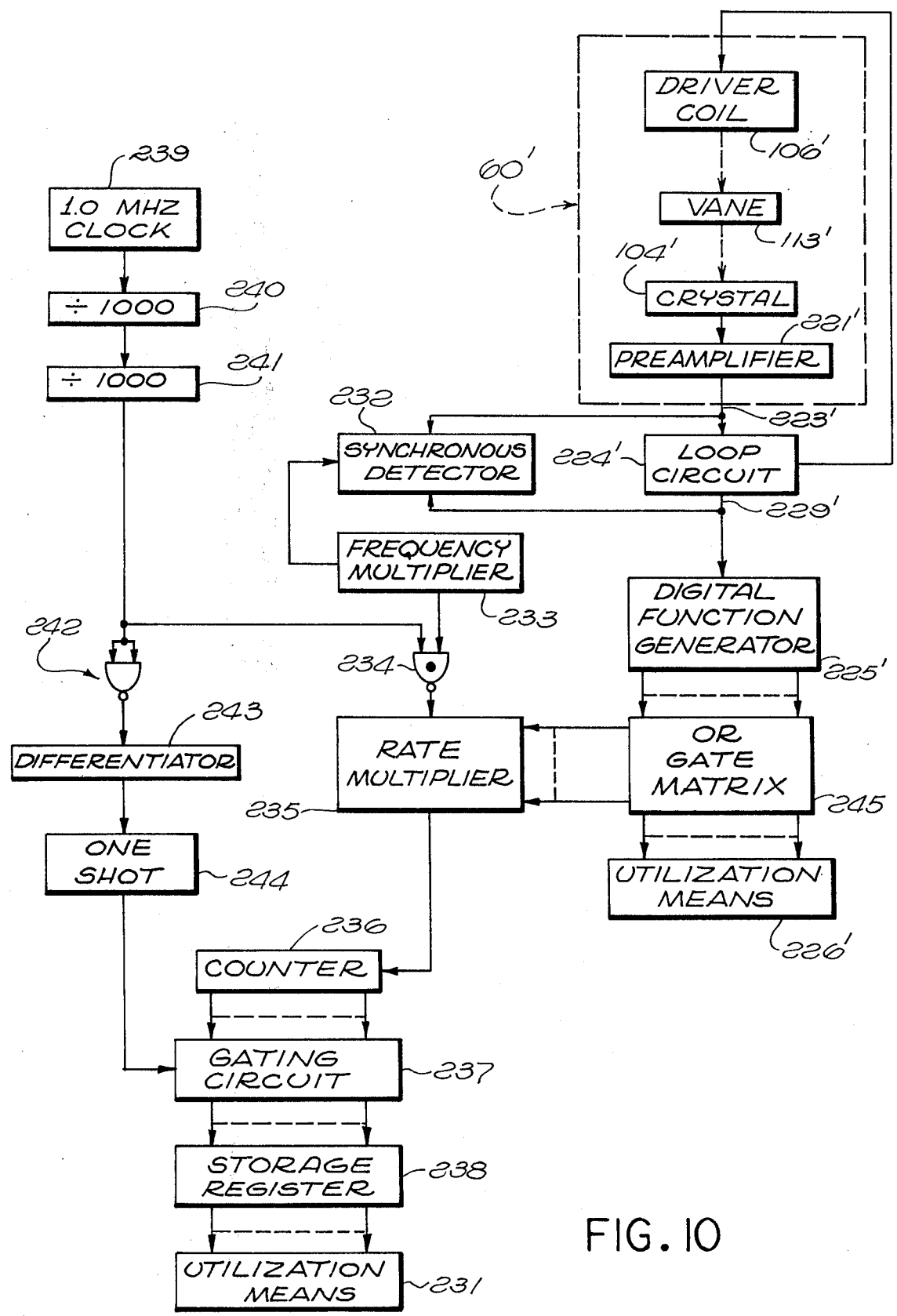
FIG. 10 is a block diagram of the system of the present invention.

In FIG. 10, parts 60', 106', 113', 104', 221', 223', 224', 229', 225', and 226' may be identical to parts 60, 106, 113, 104, 221, 223, 224, 229, 225, and 226, respectively, shown in FIG. 9.

Utilization means 231 is provided in FIG. 10. Utilization means 231 may be identical to utilization means 226 shown in FIG. 9. If both are indicators, utilization means 231 would indicate mass flow rate, whereas utilization means 226 would indicate density.

Also shown in FIG. 10 are a sychronous detector 232, a frequency multiplier 223, an AND gate 234, a rate multiplier 235, a counter 236, a gating circuit 237, a storage register 238 and utilization means 231 connected in succession in that order from probe output lead 223' and loop circuit output lead 229'.

A 1.0 MHz clock 239 and dividers 240 and 241 are connected in succession in that order to a second input of AND gate 234 and to gating circuit 237 through an inverter 242, a differentiator 243 and a one shot 244 connected in succession in that order from divider 241 to gating circuit 237.

Vortex shedding caused by shield 62 causes the signal on probe output lead 223' to be amplitude modulated at a frequency directely proportional to the ratio of mass flow rate to density.

An OR gate matrix 245 is provided to deliver the output of digital function generator 225' to both rate multiplier 235 and utilization means 226'. Utilization means 226' and matrix 245 may be omitted in some cases. Alternatively, utilization means 226' may indicate, for example, density in the regular way that utilization means 226 does in FIG. 9.

Frequency multiplier 233 may be replaced with some other structure or structures or may be entirely omitted in some cases.

In any event, synchronous detector 232, which may be entirely conventional, amplitude demodulates the signal appearing on output lead 223' of probe 60'. The frequency of the envelope so detected is multiplied by a constant in frequency multiplier 233, which frequency multiplier is also conventional. As a matter of fact, all the blocks of FIG. 10, by themselves, are entirely conventional although the combination thereof is not.

Rate multiplier 235 produces an output frequency directly proportional to the product of the output frequency of frequency multiplier 233 and the output of digital function generator 225'. The AND gate 234 is opened repeatedly for one second by divider 241. Counter 236 then counts the output of rate multiplier 235 each second the output of divider 241 is high. The contents of counter 236 is thereafter transferred to storage register 238 by gating circuit 238 when actuated by one shot 244. Utilization means 231 can then indicate mass flow rate. One shot opens gating circuit 237 beginning with the trailing edge of each positive second pulse impressed upon AND gate 234 by divider 241. The combination of and the operation of counter 236, gating circuit 237, storage register 238 and utilization means 231 is old and well known in the prior art, but the matrix 245 and/or synchronous detector 232 and/or rate multiplier 235 and all structures connected therefrom in any combination therewith is new in the art and is constructed in accordance with the present invention.

The word "densitometer" is hereby defined for use herein and for use in the claims to mean a device which produces output signals on leads 223' and 229', and at the output of digital function generator 225' shown in FIG. 10 whether or not OR gate matrix or utilization means 226' are employed.

The phrase "utilization means" is hereby defined for use herein and for use in the claims to mean utilization means 226', utilization means 231 or one or more or all of synchronous detector 232, frequency multiplier 233, AND gate 234, rate multiplier 235, OR gate matrix 245, counter 236, gating circuit 237, storage register 238, utilization means 231, clock 239, dividers 240 and 241, inverter 242, differentiator 243, and one shot 244. The utilization means defined in this paragraph other than utilization means 226' and 231 by themselves, produces a mass flow rate indication at utilization means 231 of $\dot{m}$ where $$\dot{m} = Kf_v(AT^2 - B)$$

$f_v$ is the envelope frequency of the carrier appearing on lead 223', $T$ is the reciprocal of the carrier frequency, and $K$, $A$ and $B$ are constants.

Density $d$ is given by $d = AT^2 - B$

What is claimed is:

1. Apparatus for producing an electrical output directly proportional to mass flow rate, said apparatus comprising: a vibration densitometer including a probe having a vibrating element, a loop circuit, and a function generator, said loop circuit having an input connected from an output of said probe and a first output connected to an input of said probe, said loop circuit having a second output connected to said function generator, said function generator producing an output directly proportional to the density of a fluid in which said vibrating element is immersed; an apertured shield fixed around and relative to said probe in spaced relation thereto, said shield having a shape to cause vortex shedding in the vicinity of said vibrating element when the same is immersed in a flowing fluid, said probe and said loop circuit forming an electromechanical oscillator tuned to the resonant frequency of said vibrating element, said probe causing an amplitude modulated carrier signal to be produced at the output thereof, said loop circuit producing substantially constant amplitude output signals at its outputs directly proportional to said carrier frequency, said carrier frequency being directly proportional to said flow rate resonant frequency; and utilization means connected from said output of said probe, said second output of said loop circuit, and said function generator output for producing an output directly proportional to the mass flow rate m around said vibrating element where $$\dot{m} = K f_v (AT^2 - B)$$

$f_v$ is the frequency of the envelope of said carrier,
$T$ is the reciprocal of the carrier frequency, and
$K$, $A$ and $B$ are constants.

2. The invention as defined in claim 1, wherein said flow rate utilization means includes an amplitude demodulator having a first input connected from said probe output, a second input connected from said loop circuit second output, and an output, a gate having first and second inputs, and an output, connection means between said amplitude demodulator output and said gate first input, clock means connected to said gate second input to cause a pulse train to exit said gate output of a frequency directly proportional to said envelope frequency and for a constant length of time, said constant length of time occuring periodically, a counter, a rate multiplier connected from said gate output and said function generator output to said counter causing said counter to count the same or different maximum counts during successive ones of said constant times, each said maximum count being directly proportional to the mass rate over its corresponding constant length of time.

3. The invention as defined in claim 2, wherein first final utilization means are connected from said counter.

4. The invention as defined in claim 3, wherein said first final utilization means includes a digital indicator for indicating mass flow rate constant except for updating via said counter at the end or beginning of one of said constant lengths of time or in between two successive constant lengths of time.

5. The invention as defined in claim 4, wherein said connection means includes a frequency multiplier.

6. The invention as defined in claim 5, wherein an OR gate matrix is connected from said function generator to said rate multiplier, and second final utilization means are also connected from said OR gate matrix.

7. The invention as defined in claim 6, wherein said second final utilization means includes a digital density indicator.

8. The invention as defined in claim 2, wherein said connection means includes a frequency multiplier.

9. The invention as defined in claim 8, wherein first final utilization means are connected from said counter.

10. The invention as defined in claim 9, wherein an OR gate matrix is connected from said function generator to said rate multiplier, and second final utilization means are also connected from said OR gate matrix.

11. The invention as defined in claim 8, wherein an OR gate matrix is connected from said function generator to said rate multiplier, and final utilization means are also connected from said OR gate matrix.

12. The invention as defined in claim 3, wherein an OR gate matrix is connected from said function generator to said rate multiplier, and second final utilization means are also connected from said OR gate matrix.

13. The invention as defined in claim 2, wherein an OR gate matrix is connected from said function generator to said rate multiplier, and final utilization means are also connected from said OR gate matrix.

* * * * *